United States Patent [19]

Benayoun et al.

[11] Patent Number: 5,790,608
[45] Date of Patent: Aug. 4, 1998

[54] APPARATUS AND METHOD FOR SYNCHRONIZING CLOCK SIGNALS FOR DIGITAL LINKS IN A PACKET SWITCHING MODE

[75] Inventors: Alain Benayoun, Cagnes Sur Mer; Jean-Francois Le Pennec, Nice; Patrick Michel, La Guade; Joaquin Picon, Saint Laurent Du Var, all of France

[73] Assignee: International Business Machines Corporation, Armonk, N.Y.

[21] Appl. No.: 574,840

[22] Filed: Dec. 19, 1995

[30] Foreign Application Priority Data

Dec. 20, 1994 [EP] European Pat. Off. ........... 94480179

[51] Int. Cl.$^6$ .................................................. H04L 7/00
[52] U.S. Cl. .................................... 375/356; 370/902
[58] Field of Search ...................... 375/356; 370/507, 370/509, 902, 905, 358; 455/51.1, 502

[56] References Cited

U.S. PATENT DOCUMENTS

| | | | |
|---|---|---|---|
| 4,890,303 | 12/1989 | Bader | 375/107 |
| 5,062,124 | 10/1991 | Hayashi et al. | 375/107 |
| 5,140,616 | 8/1992 | Renner | 375/107 |
| 5,333,132 | 7/1994 | Chuniaud et al. | 370/516 |
| 5,426,643 | 6/1995 | Smolinske et al. | 375/354 |

*Primary Examiner*—Stephen Chin
*Assistant Examiner*—Betsy L. Deppe
*Attorney, Agent, or Firm*—Joscelyn G. Cockburn

[57] ABSTRACT

An apparatus and a method to synchronize the clock signal of a first (or slave) data terminal equipment A (240-1) to a second (or master) data terminal equipment B (240-2) connected to a communication network (10) through respectively a first network node (51) and a second network node (52). The communication network has a reference clock that it transmits to the second network node which compares it with the clock signal that it receives from the second data terminal equipment. The phase difference is then detected and converted into a frame which may be an ATM cell or any other frames so that it can be switched with the data frames sent by the second DTE and transmitted to the first DTE through the communication network. The frame containing the phase difference has a specific header so that it can be distinguished from the other transmitted data frames. The first network node receives the frames, detects the phase difference frame and decodes it before it is sent to a digital to analog converter. This later generates then an analog signal which adjusts the phase of the reference clock that the first network node has extracted from the communication network. The adjusted clock signal is transmitted to the first DTE which is therefore synchronized with the second (or master) DTE.

15 Claims, 10 Drawing Sheets

FIG. 1 PRIOR-ART

APPARATUS AND METHOD FOR SYNCHRONIZING CLOCK SIGNALS FOR DIGITAL LINKS IN A PACKET SWITCHING MODE

TECHNICAL FIELD OF THE INVENTION

The present invention relates to a data communication system and more particularly to an apparatus and a method for synchronizing clock signal of a first data terminal equipment to another clock signal of a second data terminal equipment connected in the communication network.

BACKGROUND ART

In the world of telecommunication in which a wide variety of systems are connected in a network and operate according to their own internal clock signals, it is required to devise adapters which enable the synchronization of the network and more particularly to adapt the phase of the clock signal of a system to another system in order to enable good communication between both systems.

Network synchronization is an essential aspect of digital network design because clocking inconsistencies can result in data errors, subsequent loss, or in the extreme case total outages. In voice transmission, the loss or gain of bits (usually called slips) can occur without any noticeable effect on the quality of transmission. These slips occurs whenever the timing between the transmitter and receiver is not synchronized. They cause delays and errors and they force the users to continually resend data traffic until a synchronized reception is acknowledged by the receiver.

Today's network planner faces an array of synchronization considerations which should be carefully examined to determine which approach is best for present and future network requirements. A well planned network should have minimal slips and provide for quick recovery of synchronized timing when slips occur.

In an environment as represented on FIG. 1, two data terminal equipments DTE A and DTE B are connected through a digital network which behaves like a master. The network clock stands as a reference clock. The phase differences between the network clock and each of DTEs clocks are absorbed into elastic buffers of the adapters of the network nodes A and B. In case the buffer is full, a general reset of the adapter is done and the communication is interrupted to reset this buffer. But during the reset, all the data are lost.

To avoid this unacceptable break, refer to FIG. 1, a circuit is implemented in the prior art in order to generate the phase difference and to detect the phase difference. The circuit has to detect the phase differences between the reference clock and each DTEs clocks (CLKA, CLKB), and to transmit these phase differences digitally to a Public Switched Telephone Network (PSTN) (30) through a modem which is commonly used in such a case. A first modem B (32) transports the phase difference between the clock (CLKB) of the first DTE B (12) and the reference clock (CLK) measured digitally by a first circuit B (34) to the second DTE A (11) also connected to a second modem A (31). Both modems A and B are connected by the PSTN (30) or a leased line. This phase difference is received by a second circuit A (33) through the second modem A (31) and is converted into an analog signal which is used to correct the phase of the network clock (CLK) in order to transmit a corrected clock CLK0 to the second DTE A. This system requires a huge and expensive hardware (modems and circuits) and monopolizes a PSTN circuit and a leased line.

Another way of transmitting the phase difference from a DTE to another is to use a fixed slot of a TDM (time division multiplex) channel such as a fractional E1 or T1. This running mode requires a link with a higher capacity compared to the one needed by the data. But the implementation has the disadvantage of monopolizing a TDM slot to convey the phase difference. This slot is always dedicated to the phase difference and it cannot be used for transmitting other data. The bandwidth is therefore altered. Moreover, this solution is not adapted to a network which uses a clear channel.

Still another way or method of transmitting the phase difference between the DTE's is set forth in U.S. Pat. No. 4,890,303. The method conforms with the CCITT Draft Recommendation X.30. The method uses a fixed slot to convey the phase difference. The slot is always dedicated to the phase difference. It cannot be used to transmit other data.

Both solutions are not applicable to packet switching such as Frame Relay, X25 or ATM.

SUMMARY OF THE INVENTION

The present invention has therefore the object to bring a pass-through timing solution in packet switching oriented communications by using a SDLC frame for LAPE (Link Access Protocol Extended) applications or an ATM cell for ATM applications using the whole bandwidth of the entire channel during a short period and in a lapse of time during which the channel does not carry data.

Another object of the invention is to use the remaining bandwidth of the network in a communication session to transmit a correction information.

A further object of the invention is to use the correction information from time to time when necessary.

The present invention relates to an apparatus to be used in a communication network including a plurality of networks nodes for synchronizing a first clock signal of a first data terminal equipment DTE connected to said communication network through a first network node to second clock signal of a second data terminal equipment DTE also connected to said communication network through a second network node, said communication network having a reference clock and carrying analog signals of data frames;

said apparatus comprising:

means for extracting the reference clock from the analog signals carried by the communication network in said second network node;

means for comparing the phase between said reference clock and said second clock transmitted from said second data terminal equipment in order to detect a phase difference and to transmit said phase difference digitally on a parallel data bus;

switching means for switching said phase difference received on said parallel data bus with data frames received from said second data terminal equipment before they are transmitted to the communication network;

means for receiving in said first network node the frames carried by the communication network and extracting the reference clock in said first network node;

means for decoding said phase difference from the transmitted frames; and means for adjusting the reference clock phase according to the phase difference in order to transmit the corrected clock signal to the first data terminal equipment.

The present apparatus is to be used in connection with a method which comprises the steps of:

extracting the reference clock from the analog signals carried by the communication network in said second network node;

comparing and detecting a phase difference between said reference clock and said second clock transmitted from said second data terminal equipment;

transmitting said phase difference digitally to a packet switching means on a parallel data bus;

switching said phase difference with data received from said second data terminal equipment to transmit the analog data frames to the communication network;

receiving the data frames carried by the communication network and extracting the reference clock in said first network node;

detecting and decoding in a frame decoder said phase difference among the transmitted data frames;

transmitting said phase difference to an adjusting means which also receives said reference clock; and adjusting the reference clock phase according to the phase difference in order to transmit the corrected clock signal which stands for said first clock signal to the first data terminal equipment.

BRIEF DESCRIPTION OF THE DRAWINGS

FIG. 3-B represents an overview of the receive part of the present invention in a schematic block diagram.

DETAILED DESCRIPTION OF THE PRESENT INVENTION

Figure 1:
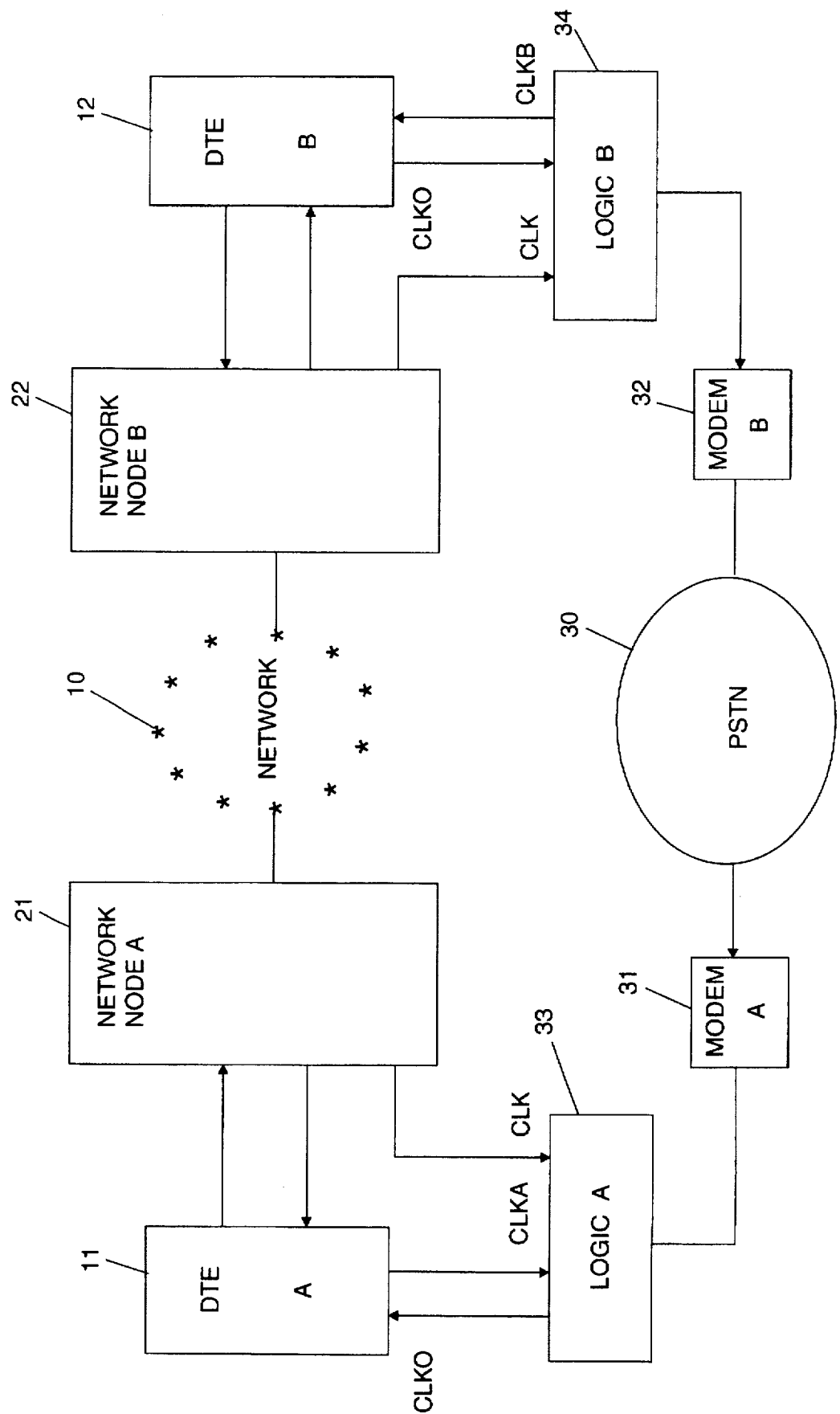
FIG. 1 represents an example of an implementation in the prior art.
Figure 2:
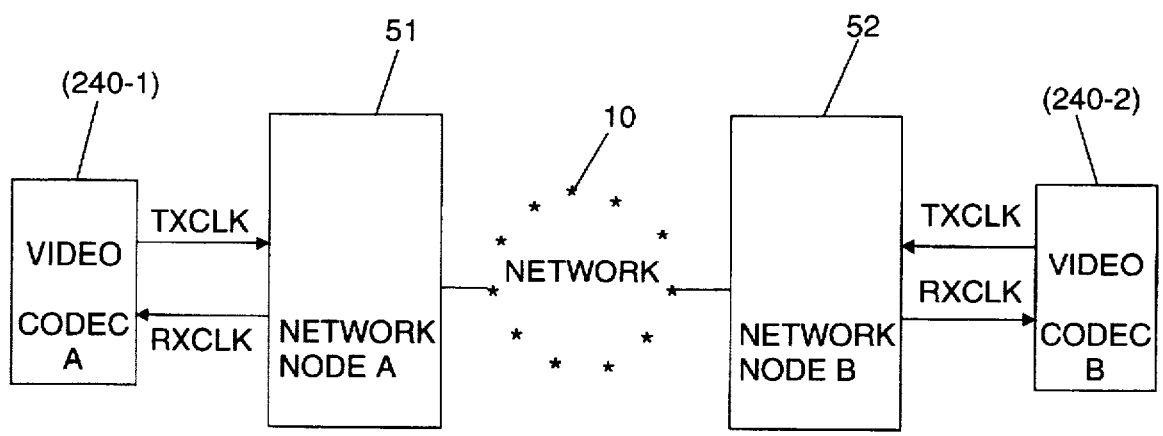
FIG. 2 represents the environment in which the preferred embodiment of the present invention is implemented.

FIG. 2 represents the multimedia environment in which, two video codec's (coder/decoder such as a video camera), a first video codec A (240-1) and a second video codec B (240-2) are connected by a network (10) which may be a private or a public network using a CCITT T1, E1, T3 or E3 etc. . . . The video codec's are respectively connected to network nodes A (51) and B (52) which may be an INDX network node (Integrated Network Digital Exchange), a TNN (Transport Network Node) or any other network nodes. It should be noted that in the preferred embodiment of the present invention, the network will be a CCITT E1 conveying an HDB3 coding signals in balanced mode.

Each network node A or B comprises circuits which are connected to the network (10) and receive the data transmitted from the opposite network node B or A. These circuits extract the reference clock and its phase from the HDB3 signals.

For instance, the network node B (52) extracts from the HDB3 signals the network clock and more particularly its phase in order to determine the phase difference between the clocks of the network and the video codec B (240-2). In the present invention, the phase difference is not transmitted through the network on a dedicated slot as it used to be in the prior art, but into a SDLC frame or ATM cell for applications using the Asynchronous Transfer Mode so that the phase correction takes less bandwidth and occurs only when necessary. It should be kept in mind the ATM protocol relates to the cells transfer, each cell of 53 bytes is composed of a header and a fixed length of payload which contains the data. The network node B (52) transmits the phase difference in an HDB3 coding signals in balanced mode through the network (10) to the network node A (51). This latter extracts from those signals the phase difference, processes and converts it into analog signals before transmitting to the video codec A (240-1).

In the same way, the network node A will make the comparison between the clocks of the video codec A and the network in order to transmit the phase difference to the video codec B.

It is to be noticed that this kind of implementation can be used in packet switching networks like Frame Relay or X25.

In order to have a better comprehension of the present invention, the TRANSMIT part (FIG. 3-A) is described separately from the RECEIVE part (FIG. 3-B) although they are on the same card chip. The common components of the Transmit and the Receive parts have the reference in parentheses throughout the description.

Figure 3A:
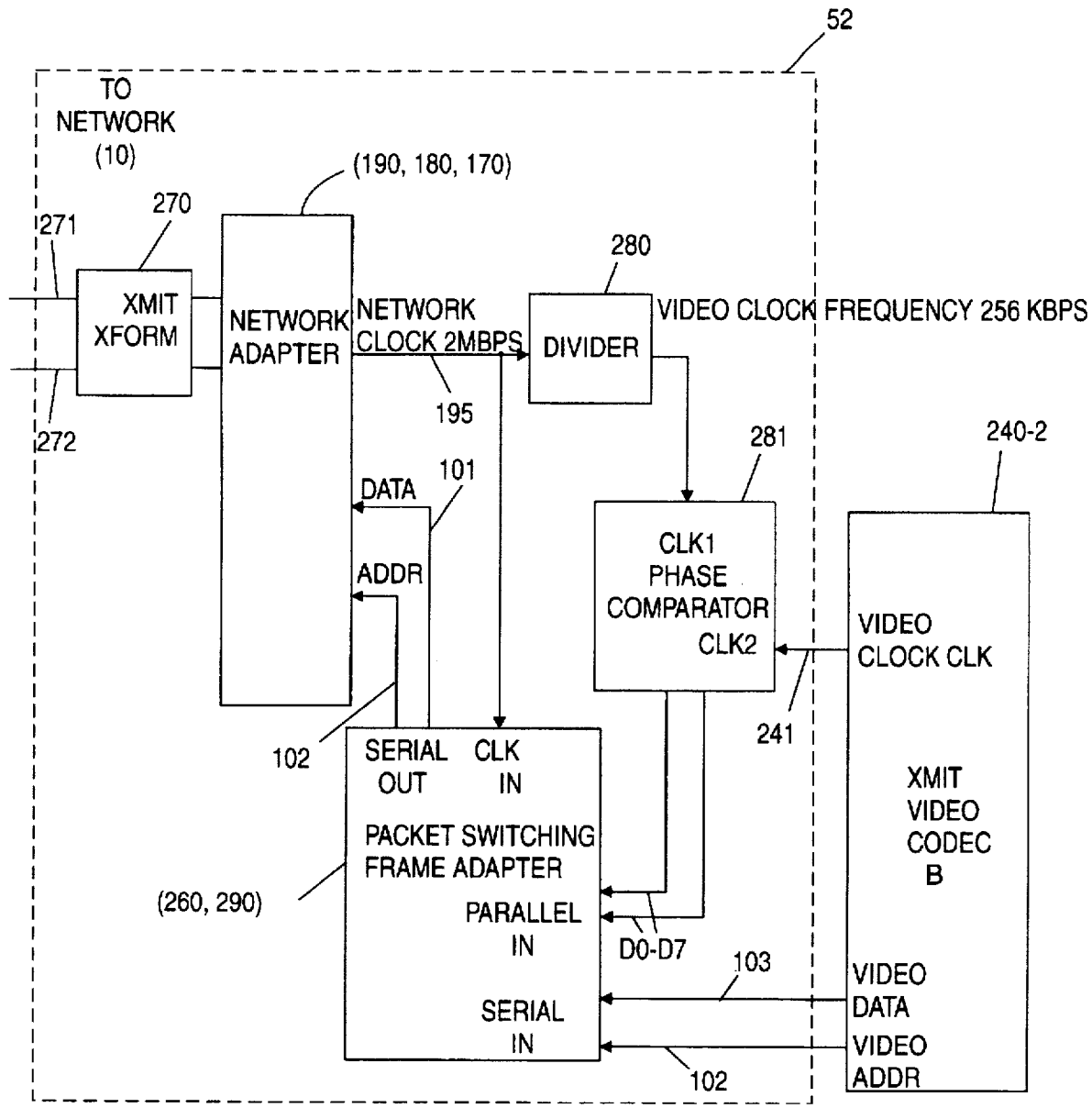
FIG. 3-A represents an overview of the transmit part of the present invention in a schematic block diagram.
Figure 3B:
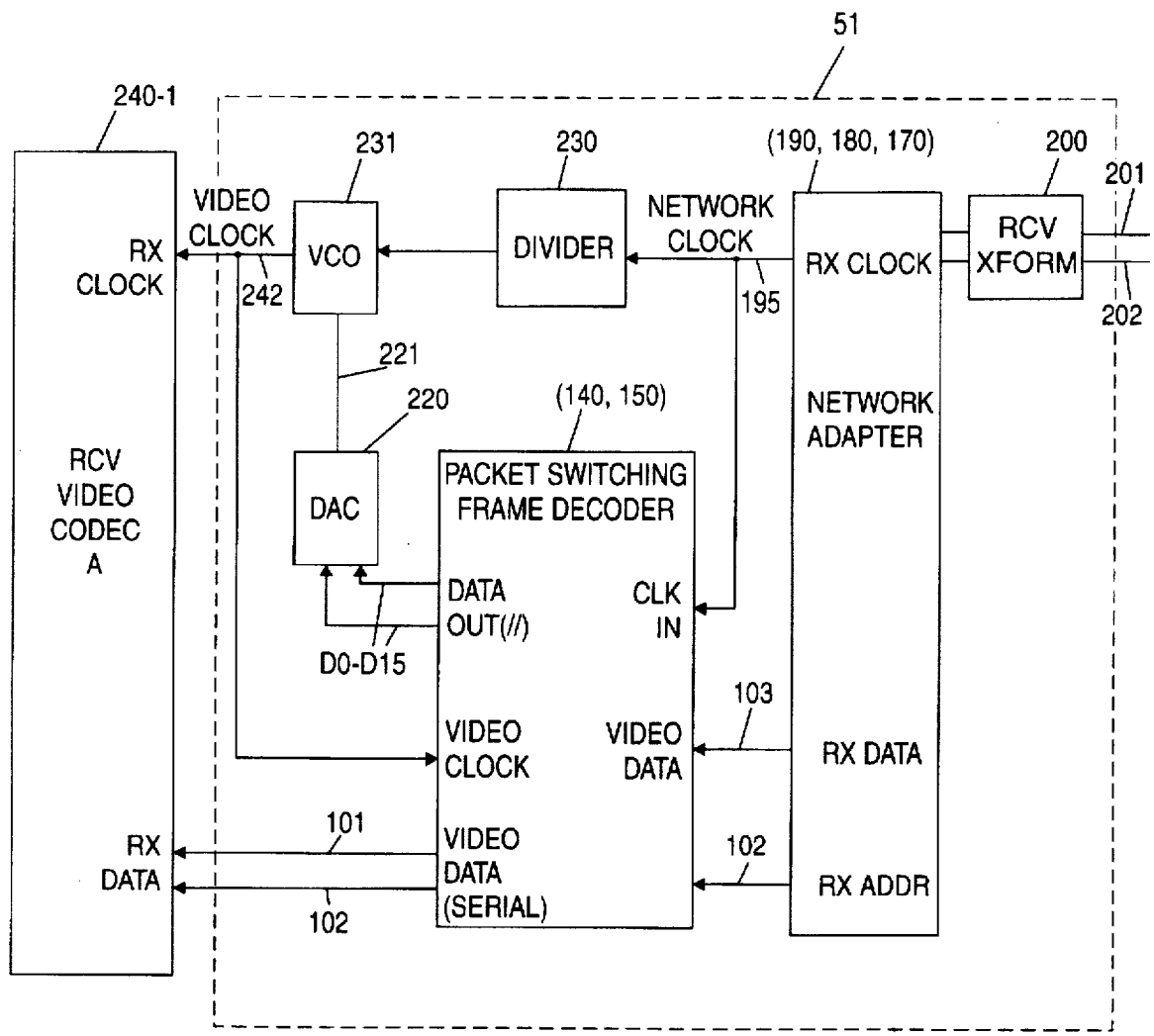

FIG. 3-A represents an overview of the transmit part of the present invention in a schematic block diagram. This block diagram enables one to understand the functions that are performed by the different components used in the preferred embodiment of the present invention. In this case, the network node B (52) receives from the network the reference clock that it compares to the clock of the video codec B in order to TRANSMIT to the network the phase difference which will be forwarded to the video codec A.

The network node B (52) comprises a network or line adapter (190,180,170) which receives HDB3 coding signals (271,272) in balanced mode from the network (10) through a transmit transformer (270). It extracts from the coding signals the network clock whose frequency is 2048 Kbps in this example, and transmits it on lead (195) to a divider (280) in order to get the same frequency, the video codec clock being at the frequency of 256 Kbps. A phase comparator (281) compares the phase between the clock reference and the clock of the video codec B (240) transmitted on lead (241). Afterwards, the phase comparator digitizes the phase difference and transmits it on a parallel bus D0–D7 to a first Packet Switching Frame Adapter (260,290) which sends it inside a SDLC frame for a Frame Relay application or into an ATM cell for an ATM application. This latter also receives the data from the video codec B on a data bus (103) and it transmits the data which contains the phase difference among other data on the data bus (101) to the network adapter according to the network clock signals that it receives on lead (195). The addresses are transmitted on an address bus (102) from the video codec B to the network or line adapter which in turn transforms the digital data into an analog data and sends them in HDB3 coding signals (271, 272) in balanced mode to the network (10).

FIG. 3-B represents an overview of the receive part of the present invention in a schematic block diagram. In this part of the embodiment, the network node A (51) RECEIVES from the network (10) the clock reference and the phase difference sent from the network node B (52).

The network node A (51) also comprises a network or line adapter (190,180,170) which receives HDB3 coding signals (201,202) in balanced mode from the network (10) through a transmit transformer (200). It extracts from the coding signals the network clock and transmits it on lead (195) to a divider (230) which is connected to a Voltage Control Oscillator (VCO) 231. The divider divides the network clock by 8 or any other number in order to obtain a frequency equal to the frequency of the video codec B. The phase difference between the clocks of the network and the video codec B is also received by the network adapter through the transformer. The digital data corresponding to the phase difference are decoded in a second Packet Switching Frame Decoder (140,150) and then sent digitally in parallel to a Digital to Analog Converter (220) on a parallel data bus D0–D15, whereas the other data are transmitted on the data bus (101) to the video codec A. The analog signals of the phase difference is transmitted to the VCO (231) which in turn adjusts the phase of the reference clock received from the divider to the phase clock of video codec B in order to transmit adjusted clock signals to the video codec A.

The second Packet Switching Frame Adapter (140,150) also receives data which do not contain the phase difference on the data bus (101) from the network adapter and it transmits those data on the serial data bus (101) to the video codec A according to said adjusted clock signals transmitted on lead (242) from the VCO (231). The addresses are transmitted on an address bus (102) from the network adapter to the video codec A (240).

The components that compose the Transmit and the Receive parts of the present invention are described more in detail in FIGS. 4-A, 4-B, 5-A and 5-B. Before we start the functional description of the invention, we will begin with the hardware description.

Hardware Description of the Transmit Part

Figure 4A:
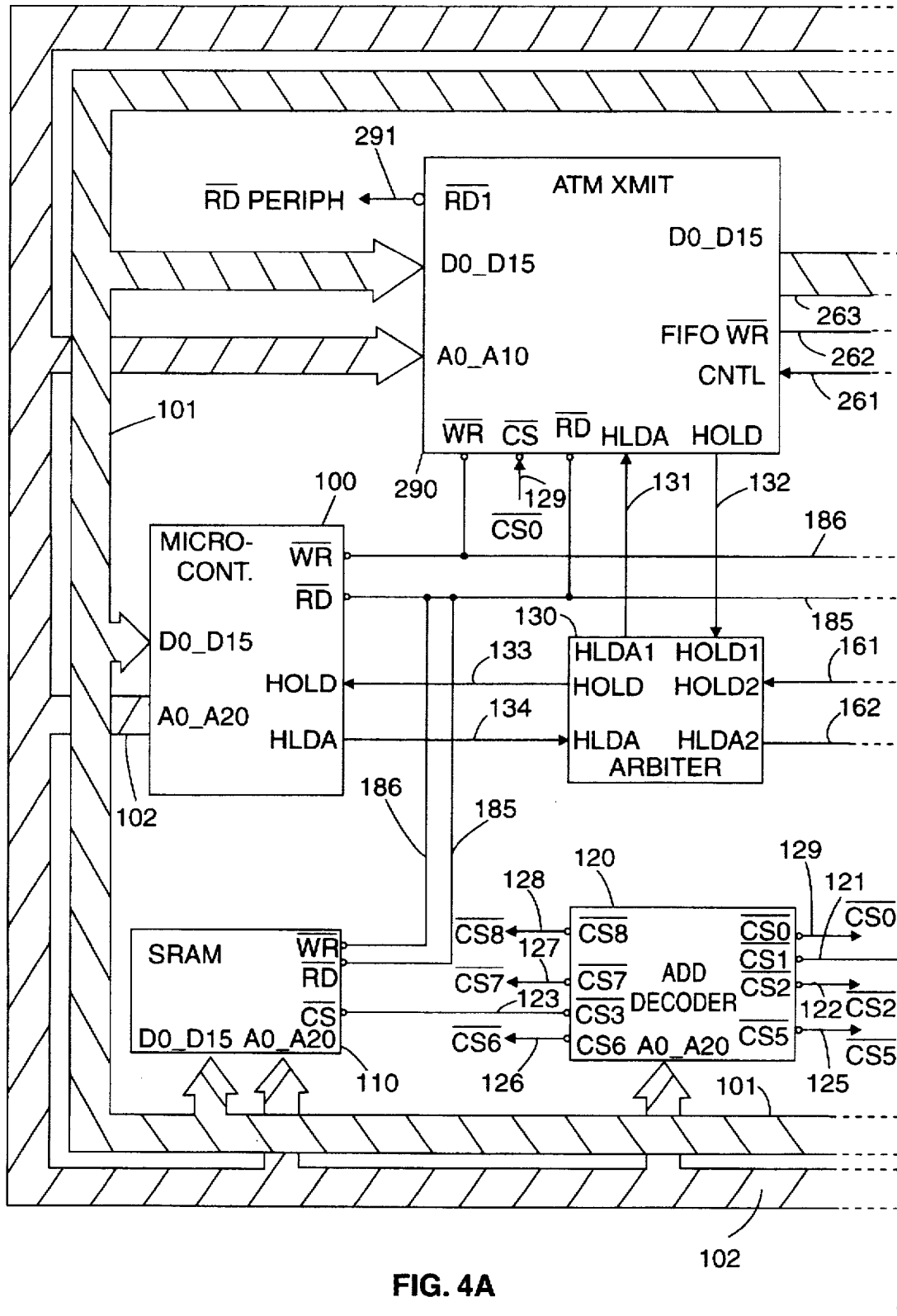
FIG. 4, consisting of FIGS. 4-A and 4-B, represents the detailed implementation of the transmit part of the present invention.
Figure 4B:
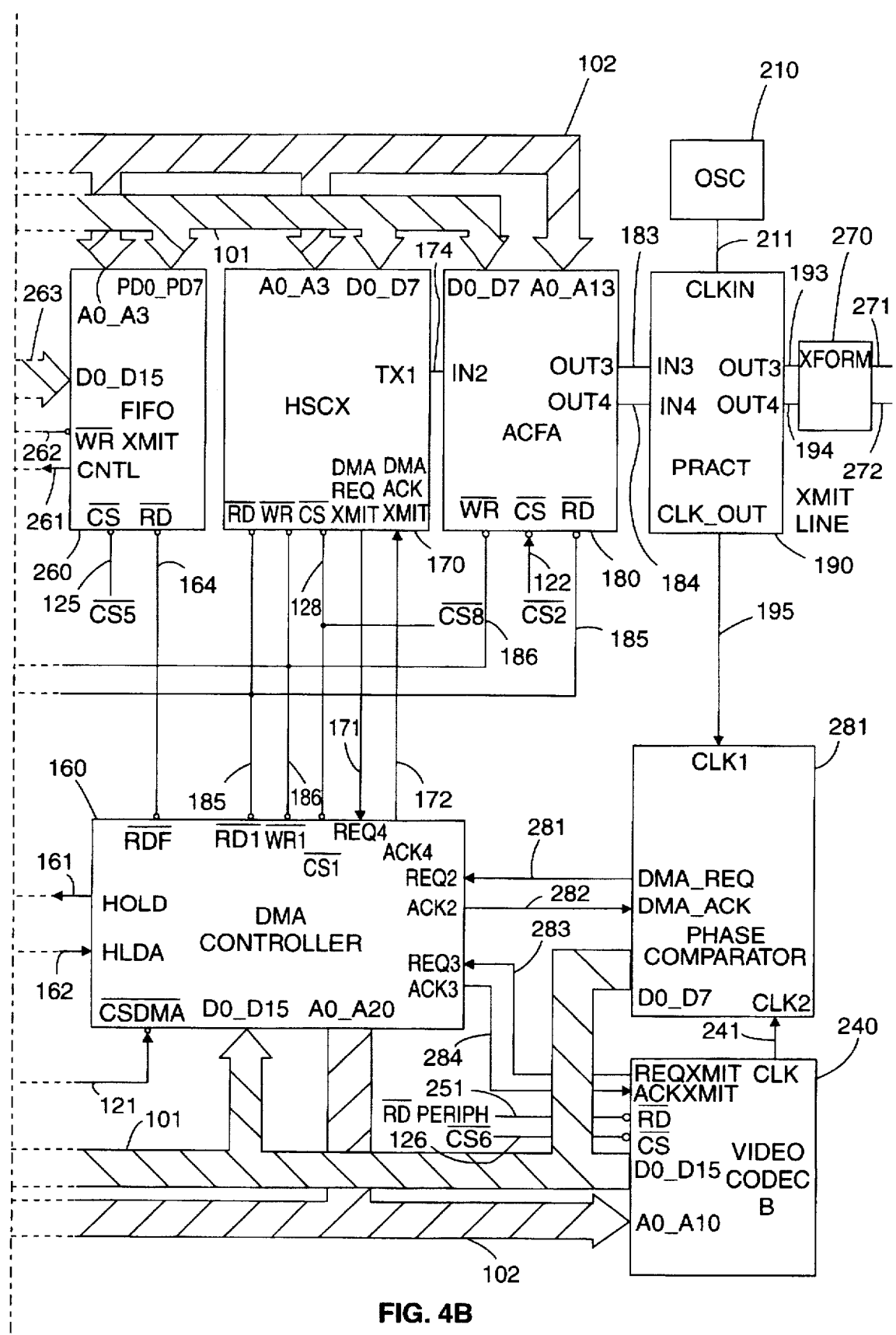

Referring to FIGS. 4A and 4B, the Transmit network transformer (270) is connected to the network (10) of the type referenced by CCITT E1 G703 for example, by two differential wires (271,272). On the other side, the transformer is connected to the network or line adapter by two leads (193,194). This latter comprises a Siemens chipset (190) called PRACT (Primary Rate Adapter Clock Generator and Transceiver), another Siemens chipset (180) called ACFA (Advanced Controller and Frame Aligner) and further more Siemens chipset (170) called HSCX (High Level Serial Communications Controller Extended). The PRACT chip is fed by an oscillator (210) at the frequency of 16.384 MHz on its input CLKIN and it transmit a clock signal CLKOUT on lead (195) to the phase comparator (280) which also receives on its input CLK2 a clock signal CLK from the video codec through lead (241). The PRACT chip receives respectively on its input IN3 and IN4 signals generated by the ACFA chip (180) on its output OUT3 and OUT4 through leads (183,184) and transmits signals on leads (193,194) to the transformer. The ACFA chip (180) receives on its input IN2 a signal from an output TX1 of the HSCX chip (170) through lead (174). It also receives respectively read (RD) and write (WR) signals on leads (185,186) from a microcontroller (100). It has a chip select input CS which is connected to an output CS2 of an address decoder (120) through lead (122). This address decoder has 9 chip select pins referred as CS0–CS8 and communicates with the ACFA chip (180) by means of a 4-bit address bus A0–A3 (102) and a 8-bit data bus D0–D7 (101).

The HSCX chip (170) is also connected to the microcontroller (100) by means of the 4-bit address bus A0–A3 (102) and a 8-bit data bus D0–D7 (101). The read and write operations of its internal registers is performed owing to the read and write signals that it receives on its inputs RD and WR through leads (185, 186) which are also connected to the two I/O pins RD1 and WR1 of a DMA Controller (160). Its chip select pin CS is connected to a pin CS8 of the address decoder (120) through lead (128) and to a chip select pin (CS1) of said DMA Controller.

The data movement of the HSCX chip (170) is made by a DMA link via the DMA Controller (160). A DMA Transmit request signal and a DMA Transmit ACK signal are respectively sent from DMA_REQ-XMIT and DMA_ACK_XMIT pins of the HSCX chip to REQ4 and ACK4 pins of the DMA Controller through leads (171,172).

A FIFO buffer (260) is connected to the microcontroller (100) by means of the data bus PD0–PD7 (101) and by means of the address bus A0–A3 (102). Its chip select input CS is connected to a pin CS5 of the address decoder through lead (125). It Read pin RD is connected to a pin RDF of the DMA Controller through lead (164) whereas its Write pin WR is connected to a FIFO_WR pin of a ATM_XMIT chip (290) through lead (262), which enables to load the data in the internal registers on a data bus D0–D15 (263) from said chip. A control signal is then transmitted from a CNTL pin of the FIFO buffer (260) to a pin CNTL of said chip through lead (261).

The ATM_XMIT chip (290) is connected to the data and address busses (101, 102) by its pins D0–D15 and A0–A10. A RD_PERIPH signal generated from a pin RD1 of said ATM_XMIT chip is connected to a video peripheral pin RD of the Video Codec B (240) through lead (291). The ATM_XMIT chip also has a Read RD and Write WR pins connected to the RD and WR pins of the microcontroller through leads (185,186). Its chip select pin CS is connected to a pin CS0 of the address decoder through lead (129).

An arbiter is also provided on the card. It has three couples of HOLD and HLDA pins referred as (HOLD/HLDA, HOLD1/HLDA1, HOLD2/HLDA2) which are respectively connected to HOLD and HLDA pins of the ATM_XMIT chip through leads (132,131), to HOLD and HLDA pins of the microcontroller through leads (133,134) and pins HOLD and HLDA of the DMA Controller through leads (161,162).

The address bus A0–A20 (102) of the microcontroller (100) is connected to the input leads A0–A20 of a Static RAM (110) whereas only 11 bits of this address bus is connected to the address pins A0–A10 of the video codec B (240). This address bus is also connected to pins A0–A20 of the address decoder (120) and to pins A0–A20 of the DMA controller (160). The 16-bit data bus D0–D15 (101) of the microcontroller (100) is connected to pins D0–D15 of the DMA controller (160), of the Static RAM (110) and of the video codec B (240). The Phase Comparator (280) already briefly described above is also connected to the data bus (101) by means of a parallel 8-bit bus D0–D7.

Pins CS1 and CS6 of the address decoder (120) are respectively connected to a pin CSDMA of the DMA controller through lead (121) and to a chip select pin CS of the video codec B through lead (126).

The DMA controller (160) also communicates with the Phase Comparator (280) and the video codec B (240). A request and an acknowledge signals are transmitted and received from pins REQ2 and ACK2 of the DMA controller to the pins DMA_REQ and DMA_ACK of the Phase Comparator through leads (281,282). The video codec B (240) has a request signal pin REOXMIT and an acknowledge signal pin ACK_XMIT which are respectively connected to pins REQ3 and ACK3 of the DMA controller (160) through leads (283,284).

Besides, the static RAM (110) has also a read RD and write WR pins which are connected to the read and write leads (185,186). Its chip select pin CS is connected to pin CS3 of the address decoder (120).

Hardware Description of the Receive Part

Figure 5A:
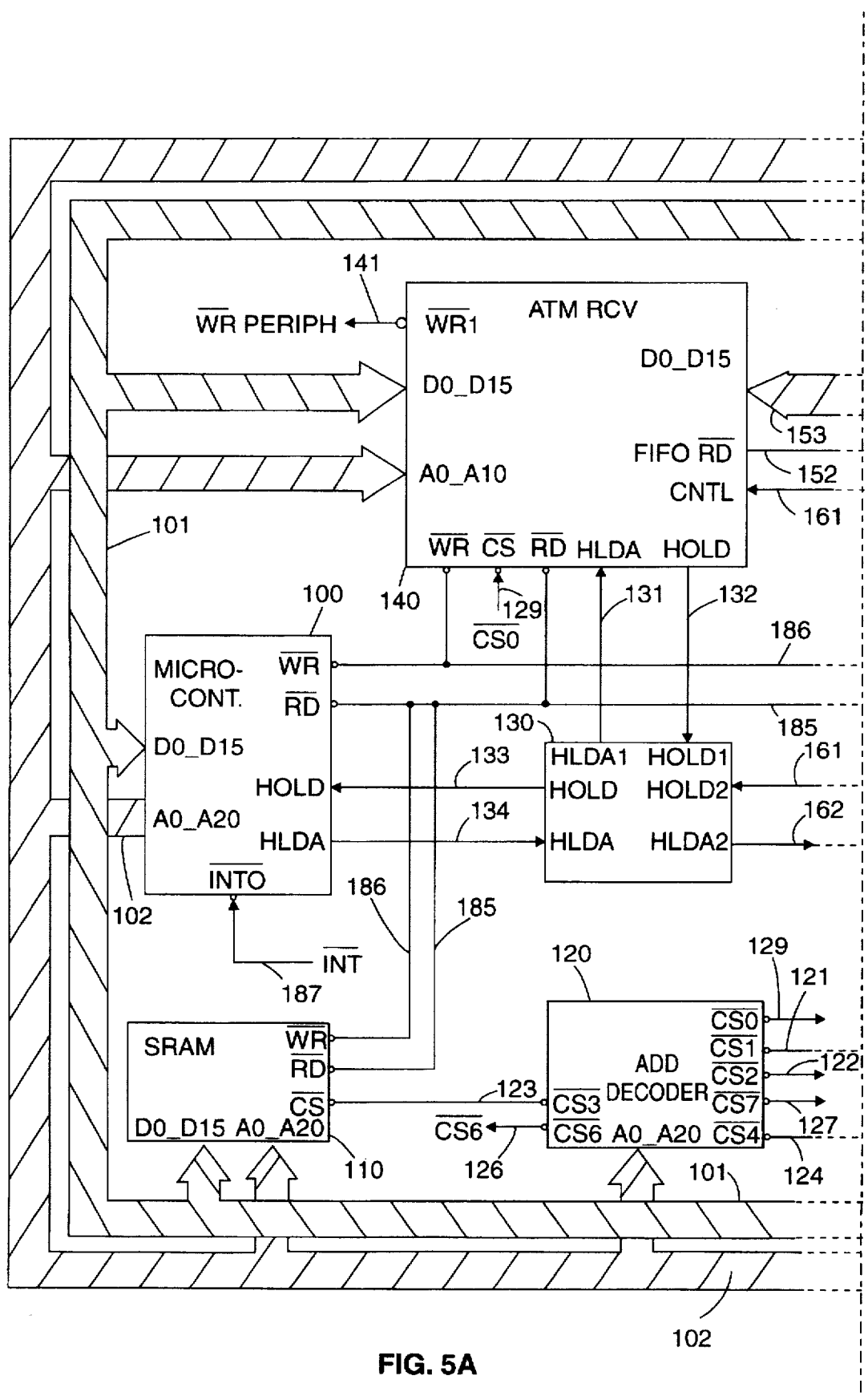
FIG. 5, consisting of FIGS. 5-A and 5-B, represents the detailed implementation of the receive part of the present invention.
Figure 5B:
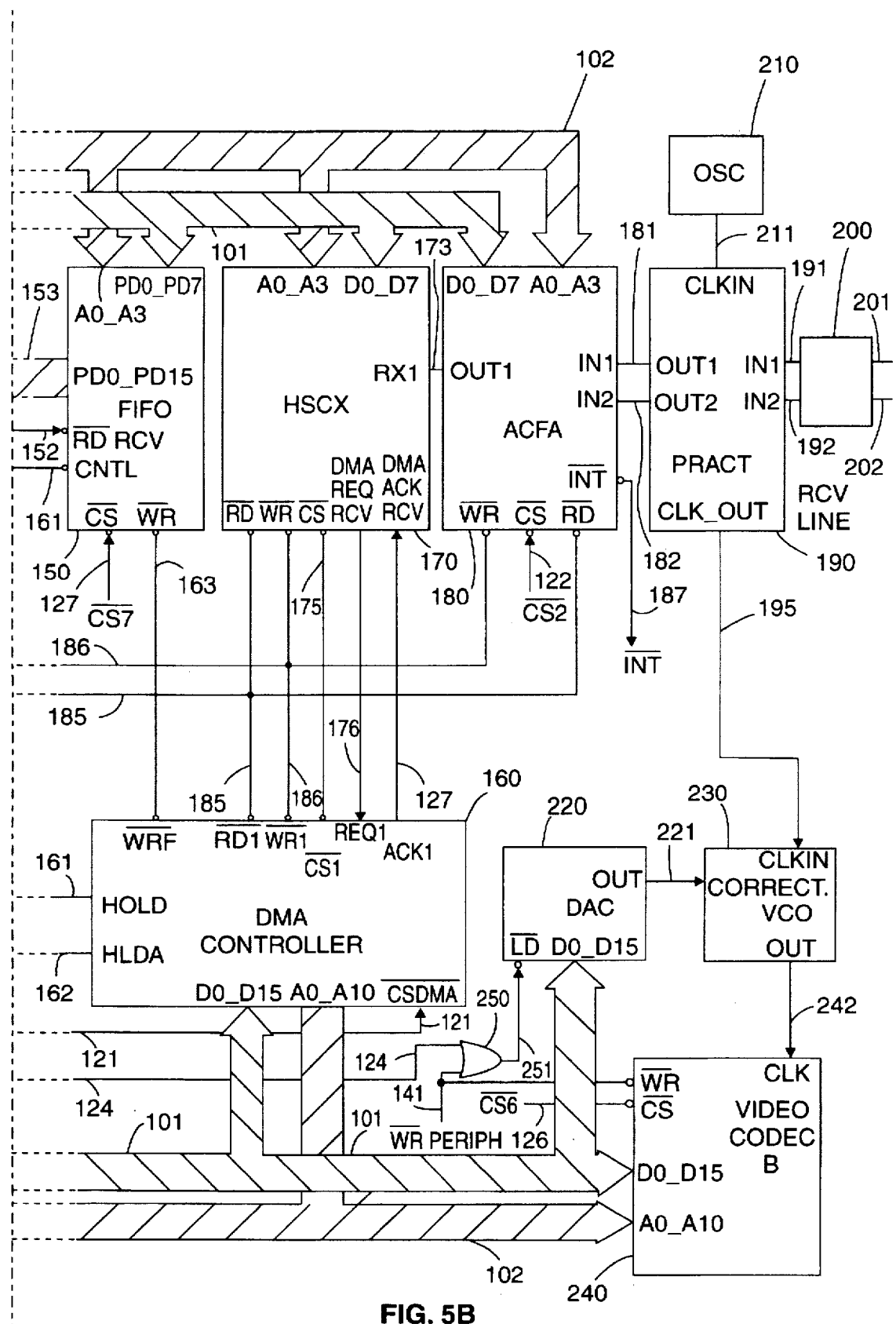

The PRACT chip (190) coupled to the oscillator (210), the ACFA chip (180), the HSCX chip (170), the DMA Controller (160), the arbiter (130), the Static RAM (110), the microcontroller (100) and the address decoder (120) are also used in the receive part except that another video codec A (240) similar to the video codec B is used for receiving the data. As a consequence, we will only describe the components which are different from the ones described in the transmit part (FIGS. 4A and 4B). The components are a receive transformer (200), an ATM receive chip referred as ATM_RCV (140), a receiver buffer referred as RCV_FIFO (150), a Digital to Analog Converter DAC (220) and a Voltage Control Oscillator VCO (230). FIGS. 5A and 5B. The connections of the common components are slightly different from the description made in the transmit part because of the introduction of the new components. The difference will be mentioned below.

The Receive network transformer (200) is connected to the network (10) of the type referenced by CCITT E1 G703 for example, by two differential wires (201,202). On the other side, the transformer is connected to inputs IN1 and IN2 of the network or line adapter (190) by two leads (191,192). The PRACT chip (190) outputs signals on its pins OUT1 and OUT2 to inputs pins IN1 and IN2 of the ACFA chip (180) through leads (181,182). This later chip has an output pin OUT1 connected to an input pin RX1 of the HSCX chip (170) through lead (173). The connection of the HSCX chip differs from the transmit part in that it has two more pins which are DMA_REQ_RCV and DMA_ACK_RCV pins respectively connected to pins REQ1 and ACK1 pins of the DMA Controller (160) through leads (176,175).

The data bus (101) connects the microcontroller (100) to the ATM_RCV chip (140), to the video codec A (240), to the DMA Controller (160), to the Static RAM (110) and to the DAC (220) by pin D0–D15. The data bus also connects the RCV_FIFO (150), the HSCX chip (170) and the ACFA chip (180) by the least significant bits D0–D7.

The address bus (102) connects the microcontroller (100) to the SRAM (110) and to the address decoder (120) by pin A0–A20. Its least significant bits A0–A10 connects the ATM_RCV chip (140) to the DMA controller (160) and to the video codec A (240), whereas the bits A0–A3 connects the RCV_FIFO buffer (150) to the HSCX chip (170) and the ACFA chip (180).

The RD and WR pins of the microcontroller (100) are also connected to the RD and WR pins of the ACFA chip (180), of the HSCX chip (170), of the ATM_RCV chip (140), of the SRAM (110) and of the DMA Controller (160).

In the Receive part, the address decoder (120) has the outputs CS0, CS1, CS2, CS3, CS4, CS6 and CS7 connected respectively to the chip select pin CS of the ATM_RCV chip (140), to the CSDMA pin of the DMA Controller (160), to the CS of the ACFA chip (180), to the CS of the SRAM (110), to the first input of a 2-input OR gate (250) through lead (124), to the CS of the video codec A (240) through lead (126) and to the CS of the RCV_FIFO buffer (150) through lead (127).

In addition to the connections mentioned in the transmit part, the microcontroller (100) further has an incoming interrupt pin INT0 connected to an outgoing pin INT of the ACFA chip (180) through lead (187). The ATM_RCV chip (140) has an output pin WR1 connected to an input pin WR of the video codec A (240) and to the second input pin of the OR gate (250) through lead (141) carrying the Write peripheral signal WR_PERIPH. This OR gate (250) has an output connected to an input LD of the DAC (220) through lead (251). This DAC has an output connected to a CORRECT pin of the VCO (230) through lead (221). This VCO (230) has an input pin CLKIN connected to the output CLKOUT of the PRACT (190) through lead (195), which is the same as in the transmit part, and an output pin OUT connected to the input pin CLK of the video codec A (240) through lead (242).

Finally, from its output PD0–PD15, the RCV_FIFO buffer (150) communicates with a bus input D0–D15 of the ATM_RCV chip (140) through a 16-bits data bus (153), and owing to a Read RD lead (152) and a Control CNTL lead (161).

Functional Description

Figure 6:
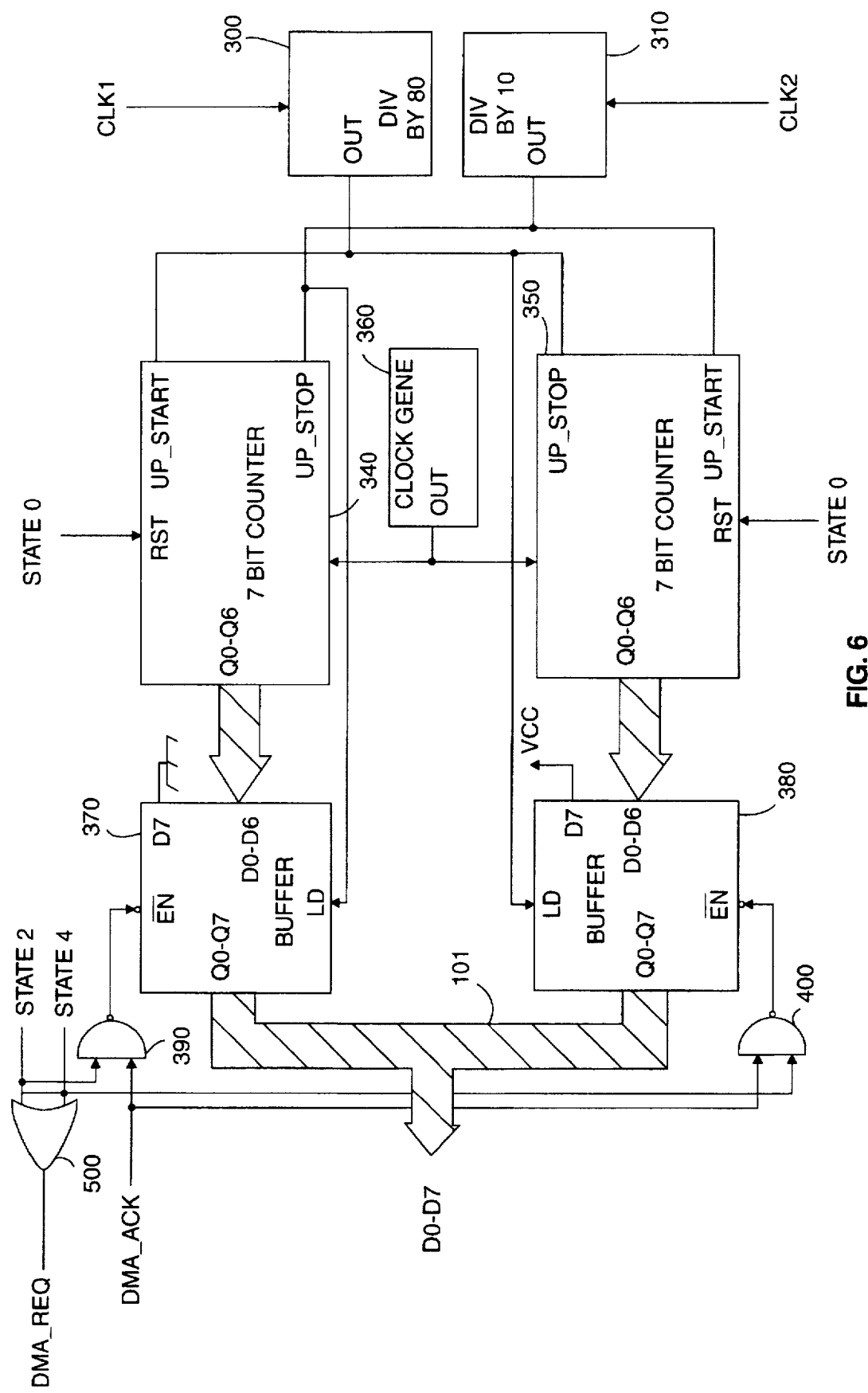
FIG. 6 shows in detail the implementation of the phase comparator used in the transmit part of the present invention.
Figure 7:
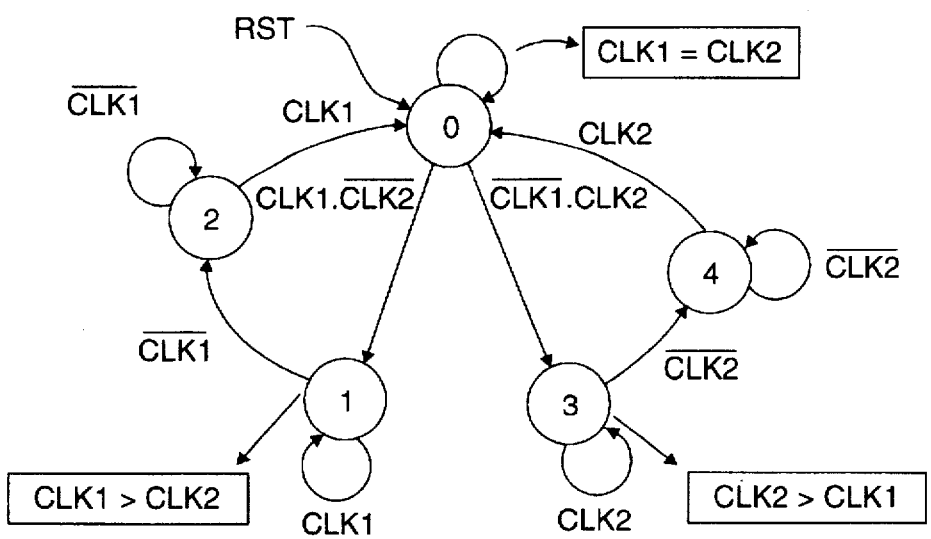
FIG. 7 represents the functional diagram of the state machine used in the phase comparator.
Figure 8:
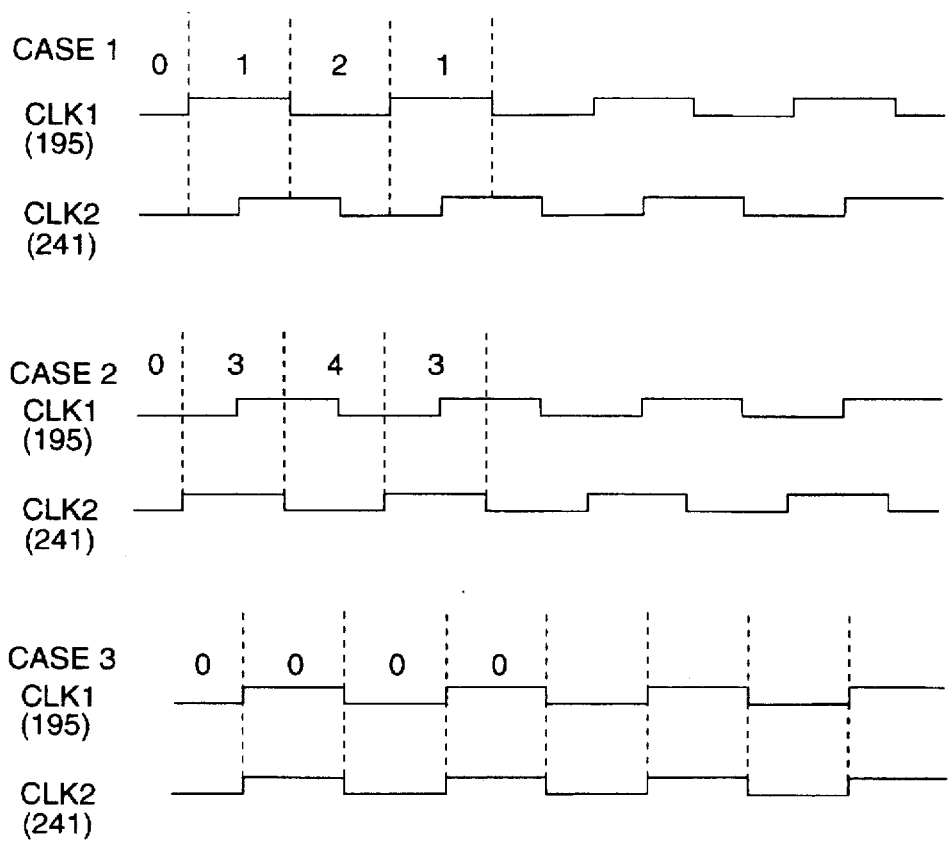
FIG. 8 shows the timing diagrams of the different clocks representing the corresponding states that occur in the state machine.

In order to understand how the different components described in the hardware description function, it is also necessary to refer to FIGS. 6, 7 and 8.

Additionally, the basic operations of the state machine, illustrated in details in the corresponding FIGS. 7 and 8, make clearer the functions performed by the phase comparator implemented according to the present invention.

The functional description of the preferred embodiment of the present invention can be divided in two parts, firstly the transmit operation and secondly the receive operation. It should be kept in mind that the hardware described in the present invention may be replaced by other components as long as the functions can be performed as described below.

The Transmit Operation

On power on reset, the microcontroller (100) which is the INTEL 87C196 in present invention runs the Basic Assurance Tests (BAT's) in order to assure the accessibility of all the registers of the card containing the receive and the transmit circuits. Afterwards, it programs the programmable chips that are the ACFA chip (180) and the HSCX chip (170) and more particularly the commands of the internal DMA of its internal FIFO not shown in the figure.

The function of the HSCX chip is to encapsulate the data and to send to the ACFA chip and PRACT chip and to check at the reception the integrity of the data encapsulated into SDLC frame (Synchronous Data Link Control). It is to be noticed that this function may be disabled in order to improve the performance of the machine in term of rapidity of the transmission. Afterwards, the microcontroller programs the ATM_XMIT chip (290) and ATM_RCV chip (140) to select the transfer mode chosen and more particularly the VP (virtual path) and VC (virtual circuit). It also programs the addresses of DMAs integrated into these Chips and respectively the flow control CNTL (leads 261 and 151) for the Xmit and Rcv operations between these chips and the Xmit_FIFO and Rcv_FIFO buffers (150 and 260).

The DMA controller (160) is also programmed with the starting addresses, due to the program integrated inside the PROM of the microcontroller (100).

The reference clock of the network carried inside the HDB3 coding signals is transmitted through the transformer (200) to the PRACT chip (190) on its inputs IN1 (191) and IN2 (192) shown on FIGS. 4A and 4B, and extracted by the PRACT chip and generated on its output (CLKOUT) to the input clock (CLK1) of the phase comparator (281) on lead (195).

The clock signal issued from the output CLK of the video peripheral B (240) for the transmit operation, is transmitted to the phase comparator (280) on its input CLK2 on lead (241).

The Phase Comparator (281) compares the reference clock (referred as clock 1) received on its input CLK1 with the clock (referred as clock 2) of the video codec B received on its input CLK2, is used only in the transmit operation and is described in more detail in FIG. 6. The phase comparison is performed by a state machine as described in FIG. 7 which comprises 5 states. The state 0 is the starting state which resets two 7-bit-counters (340) and (350). The state 1 occurs when the up transition of clock 1 is detected before the up transition of clock 2. The state 3 occurs when the up transition of clock 2 is detected before the up transition of clock 1. Both cases are described below.

Referring to FIG. 6, in case the rising edge or the up transition of clock 1 is earlier than the one of clock 2, the frequency of clock 1 is divided by 80 in a first divider circuit (300). The number 80 is given as an example in order to obtain the frequency of 25.6 Kbps which is equal to 2.048 Mbps divided by 80. It can be higher or lower. Afterwards, the resulting clock signal is then received by the first 7-bit-counter (340), the eighth bit being dedicated to the sign. The first counter (340) stops on the rising edge of a clock signal issued by a divider (310), said clock signal being the clock signal CLK2 divided by 10. This first counter (340) is clocked by an oscillator (360) which generates a clock signal whose frequency is for example 10 times greater than clock 1. The output of the first counter (340) is a 7-bit length word Q0-Q6 transmitted on a parallel bus representing the value digitally coded of the phase difference between clocks 1 and 2 to a first buffer (370). This later always has its eighth bit clamped to 0 which means that the phase difference is positive (in our case the rising edge of clock 1 earlier than the one of clock 2). The 8 bit-word Q0-Q7 issued from the first buffer (370) is validated on the tri-state bus (101) of the microprocessor (100) by a two-input NAND gate (390), due to the enable signal received on its input EN. The AND gate (390) is validated by the state 2 of the state machine and also by the DMA_ACK signal given by the DMA controller (160) which has received a DMA request signal referred as DMA_REQ on lead (281) from the phase comparator. The DMA_REQ signal is generated from a two-input OR gate (500) being activated by the states 2 and 4 of the state machine.

In the same way, in case the rising edge of clock 2 is earlier than the one of clock 1, a second 7-bit counter (350) is enabled. This later is reset by state 0 of the state machine and it starts when it receives the rising edge of a clock signal which is the clock signal CLK2 divided by 10 in a divider (310). The second counter (350) stops on the rising edge of the clock signal issued by the divider (300). Similarly to the above case, the output Q0-Q6 of the counter (350) has a binary value proportional to the amplitude of the phase difference. Q0-Q6 are connected to the 7 inputs of a second buffer (380) which has its eighth bit D7 always clamped to the value 1. This value will give the sign corresponding to the case CLK2 earlier than CLK1. This byte is transmitted from the output of the second buffer (380) in Q0-Q7, but this byte will be active only during the state 4 of the state machine and the DMA acknowledge signal through a 2-inputs NAND gate (400).

The DMA request is performed by a two-input OR gate (500) receiving on a first input the decoding of the state 2 of the state machine and on a second input the decoding of the state 4 to the REQ2 input of the DMA controller (160). The DMA controller makes a HOLD request to the input HOLD2 of the arbiter (130) which generates a HOLD signal to the microcontroller (100). When the microcontroller (100) is ready to release its address and data busses (102) and (101), it rises an hold acknowledge HLDA which is sent to the arbiter (130) on its input HLDA, then the arbiter (130) sends its output HLDA2 to the HLDA input of the DMA controller (160). This will leads to the generation from its output ACK2 to the DMA_ACK of the phase comparator (280) through lead (282).

The DMA controller (160) reads only on the 8 LSB data bus (101) the information given by the phase comparator and stores in the ATM Xmit chip (290), due to the write signal generated from pin WR1 of the DMA controller to the write pin WR of the ATM Xmit chip, chip select signal CS0 generated by the address decoder (120), and the address generated by the DMA controller on the address bus (102).

This byte stored in the ATM_Xmit chip (290) is converted into an ATM cell with a header having the following parameters Virtual Path Identifier (VPI=00A), Virtual Circuit Identifier (VCI=000B), Cell Lost Priority (CLP=0), and Head Error Check (HEC) of the cell computed by the ATM HEC generator. When the ATM_Xmit chip (290) is ready to send this ATM cell, it activates the signal FIFO write on lead (262) which is connected to the input signal WR on the Xmit_FIFO (260) and transmits the data on the data bus (263) from its pin D0-D15 to the FIFO_Xmit, and in the same time the address decoder (120) generates the chip select signal CS5 to the Xmit_FIFO. The internal address of the Xmit_FIFO is given by the 4 LSB A0-A3 of the address bus (102).

The data inside the Xmit_FIFO (260) are transmitted to the HSCX chip (170) on request as soon as its internal buffers are empty. This transfer is performed on the occurrence of the DMA_REQ_Xmit signal issued through lead (171) by the HSCX chip to the input REQ4 of the DMA controller (160). This latter activates a HOLD signal through lead (161) to the microcontroller (100). When the microcontroller (100) is ready, it sends back an HLDA to the arbiter (130) which generates the HLDA2 connected to the HLDA input of the DMA controller (160) which in turn generates a hold acknowledge signal from its pin ACK4 to the DMA_ACK_Xmit input of the HSCX chip (170). Then the DMA controller (160) generates an address from its address pins A0-A20 decoded by the address decoder (120) which generates a chip select signal CS5. In the same time, it generates a read FIFO signal (RDF) connected to the Read signal of the FIFO Xmit chip (260) followed by a write signal WR1 connected to the write signal WR of the HSCX chip (170). The ATM cell is encapsulated into a SDLC frame and sent in serial to the ACFA chip (180). The ACFA chip performs its frame alignment task and sends the frame to the PRACT chip which converts this binary frame into a HDB3 coded signals which is transmitted to the network in the G703 CCITT framing mode through the line transformer (270) via the balanced line (271 and 272).

The Receive Operation

The ATM cell is sent by the Xmit part of the Network Node B and received by the transformer (200) in an HDB3 coded signals in balanced mode, then converted by the PRACT chip (190) to transmit these signals to the ACFA chip (180). This latter sends a ground referenced signal through lead (173) to the RX1 input of the HSCX chip (170).

When the internal FIFO buffer of the HSCX chip (170) is full, it generates a DMA_REQ_RCV signal connected to the input REQ1 of the DMA controller (160) which issues a HOLD signal to the HOLD2 pin of the arbiter (130). This latter generates a HOLD signal to the microcontroller (100). When the microcontroller is ready, it generates an HLDA signal to the arbiter (130) which generates in turn a HLDA2 signal to the DMA controller (160). This latter generates finally an acknowledge signal from its pin ACK1 to the input DMA_ACK_RCV of the HSCX chip. The DMA controller (160) generates then on the address bus (102) an address from its address pins A0–A10 to the address decoder (120) which decodes and generates a chip select signal CS1. The DMA controller (160) also generates a read signal from its pin RD1 to the read input RD of the HSCX chip which reads the data in its internal FIFO buffer in order to transfer these data to the Rcv_FIFO buffer (150). The write operation in the Rcv_FIFO buffer (150) is performed by the generation of a chip select signal CS7 on lead (127) and a write signal WRF on lead (163) to the write input pin WR of Rcv_FIFO buffer (150). A level detection mechanism is implemented inside the Rcv_FIFO buffer (150): the control signal CNTL on lead (161) is activated when the level reaches its maximum (this maximum being programmable by the microcontroller 100). In this way, the ATM_RCV Chip (140) is aware that the data are ready to be transferred. When the control signal CNTL is activated, it uses its own internal DMA to transfer these data. This transfer is performed by the generation of its HOLD output signal to the HOLD1 input of the arbiter (130) which in turn generates a HOLD to the microcontroller (100). When this latter is ready to be stopped, it generates a hold acknowledge signal HLDA to the arbiter (130) which generates a HLDA1 signal to the ATM_RCV chip (140) through lead (131). Then this latter is able to read the data in the RCv_FIFO buffer (150) by generating a FIFO buffer read signal to the Rcv_FIFO buffer and stores these data into its internal RAM. These data are in an ATM cell format which is decoded and the byte D0–D7 related to the phase difference is sent on the LSB A0–A10 of the data bus (101). This transfer is also performed by the generation of the write signal WR1 called WRPERIPH on lead (141) and an address signal generated on pins A0–A10 by the ATM_RCV chip (140) which is decoded by the address decoder (120) generating the chip select signal CS4. This byte is loaded into the Digital Analog Converter DAC (220) by the 2 input OR gate (250) having on its first input the CS4 signal and on its second input the WRPERIPH signal. This OR gate generates on its output the load signal LD on lead (251). The byte is then converted into an analog signal and transmitted from its output pin OUT (221) to the VCO (230).

The video codec A (240) is clocked by the output pin OUT of the Voltage Control Oscillator (VCO) (230) which receives the reference clock from the PRACT chip (140) that it extracts from the G703 CCITT Network.

The value of the analog output signal of the DAC (220) applied to the CORRECT input of the VCO (230) leads to a modification of the phase of the reference clock on the output pin OUT of the VCO (230) in order to enslave the clock of the received video codec A to the clock of the xmit video codec B of the opposite Network node.

In a similar way, the data issued from the video codec B (240) relating to the video and audio signals are transferred to the video codec A (240) through the network by using another ATM cell having a dedicated Virtual Path Identifier and Virtual Circuit Identifier.

We claim:

1. An apparatus to be used in a communication network including a plurality of network nodes for synchronizing a first clock signal of a first data terminal equipment DTE connected to said communication network through a first network node to second clock signal of a second data terminal equipment DTE also connected to said communication network through a second network node said communication network having a reference clock and carrying analog signals of data frames;

said apparatus including:

means for extracting the reference clock from the analog signals carried by the communication network in said second network node;

means for comparing the phase between said reference clock and said second clock transmitted from said second data terminal equipment in order to detect a phase difference and to transmit said phase difference digitally on a parallel data bus;

packet switching means for switching said phase difference received on said parallel data bus with data frames received from said second data terminal equipment before the phase difference and the data frames are transmitted to the communication network;

means for receiving in said first network node the frames carried by the communication network and extracting the reference clock in said first network node;

means for decoding said phase difference from the transmitted frames; and means for adjusting the reference clock phase according to the phase difference in order to transmit a corrected clock signal to the first data terminal equipment.

2. The apparatus for synchronizing of claim 1 wherein said detecting means comprises:

means for storing the data frames and the phase difference frame transmitted from the communication network (10); and means for detecting the frame containing the phase difference to transmit it to a digital to analog converter which generates and forwards corresponding analog signals to said adjusting means.

3. The apparatus for synchronizing set forth in claims 2 or 1 wherein said comparing means comprises:

a first divider receiving said reference clock for obtaining a first divided clock signal;

a second divider receiving the second clock signal of said second data terminal equipment for obtaining a second divided clock signal to equalize the frequency of said first divided clock signal;

counting means for detecting the phase difference between said first and second divided clock signals; and storing means for storing said phase difference before it is transmitted on said parallel data bus with the corresponding sign according to whether said first divided clock signal is earlier or later than said second divided clock signal.

4. A method to be used in communication network including a plurality of networks nodes for synchronizing a first clock signal of a first data terminal equipment DTE connected to said communication network through a first network node to a second clock signal of a second data terminal equipment DTE also connected to said communication network through a second network node said communication network having a reference clock and carrying analog signals of data frames; said method comprising the steps of:

extracting the reference clock from the analog signals carried by the communication network in said second network node;

comparing and detecting a phase difference between said reference clock and said second clock transmitted from said second data terminal equipment;

transmitting said phase difference digitally to a packet switching means on a parallel data bus;

switching said phase difference and data frames received from said second data terminal equipment before the phase difference and the data frames are transmitted to the communication network (10);

receiving the data frames carried by the communication network and extracting the reference clock in said first network node;

detecting and decoding in a frame decoder said phase difference among the transmitted data frames;

transmitting said phase difference to an adjusting means which also receives said reference clock; and adjusting the reference clock phase according to the phase difference in order to transmit a corrected clock signal which stands for said first clock signal to the first data terminal equipment (240-1).

5. The method according to claim 4 further comprising the steps of, after the detecting and decoding step:

storing the data frames and the phase difference frame transmitted from the communication network (10);

decoding the frames and detecting the frame containing the phase difference to transmit it to a digital to analog converter; and generating analog signals corresponding to said phase difference in order to adjust the reference clock.

6. An apparatus for synchronizing local clocks of at least two stations connected through at least two network nodes to a communication network comprising:

a comparator for comparing the phases between a reference clock provided by the communication network and a clock provided by one of said at least two stations;

a frame adapter for converting a result from said phase comparison into a first frame conforming to a packet switching protocol and for switching said first frame with data frames originating from the one of said at least two stations; and transmitter for transmitting the first frame through the communication network to another one of the at least two stations whereat the phase difference is used to regenerate a local clock synchronized with the clock provided by said one of said at least two stations.

7. The apparatus of claim 6 wherein the packet switching protocol includes an ATM protocol.

8. The apparatus of claim 6 wherein the packet switching protocol includes Frame Relay.

9. A method for synchronizing local clocks of at least two stations connected through at least two network nodes to a communication network comprising:

comparing the phases between a reference clock provided by the communication network and a clock provided by one of said at least two stations;

converting a result from said phase comparison into a first frame conforming to a packet switching protocol;

switching said first frame with data frames originating from the one of said at least two stations; and transmitting the first frame through the communication network to another one of the at least two stations whereat the phase difference is used to generate a local clock synchronized with the clock provided by said one of said at least two stations.

10. A method for synchronizing local clocks of at least two stations connected through at least two network nodes to a communication network comprising:

determining a chase difference between a reference clock provided by the communication network and a clock provided by one of said at least two stations;

converting the phase difference into a first frame conforming to a packet switching protocol;

switching said first frame with data frames originating from the one of said at least two stations; and transmitting the first frame through the communication network to another one of the at least two stations whereat the phase difference is used to generate a local clock synchronized with the clock provided by said one of said at least two stations.

11. An apparatus to be used in a communication network including a plurality of network nodes for synchronizing a first clock signal of a first data terminal equipment DTE connected to said communication network through a first network node to second clock signal of a second data terminal equipment DTE also connected to said communication network through a second network node, said communication network having a reference clock and carrying analog signals of data frames;

said apparatus including:

means for extracting the reference clock from the analog signals carried by the communication network in said second network node;

means for comparing the phase between said reference clock and said second clock transmitted from said second data terminal equipment in order to detect a phase difference and to transmit said phase difference digitally on a parallel data bus;

switching means for switching said phase difference received on said parallel data bus with data frames received from said second data terminal equipment before the phase differences and the data frames are transmitted to the communication network, said switching means further including means for converting said phase difference into a phase difference frame with an identifier header;

means for storing said phase difference frame and data frame sent by said second data terminal equipment;

means for receiving in said first network node the frames carried by the communication network and extracting the reference clock in said first network node;

means for detecting said phase difference from the received frames; and means for adjusting the reference clock phase according to the phase difference in order to transmit a corrected clock signal to the first data terminal equipment.

12. A method to be used in a communication network including a plurality of network nodes for synchronizing a first clock signal of a first data terminal equipment DTE connected to said communication network through a first network node to a second clock signal of a second data terminal equipment DTE also connected to said communication network through a second network node, said communication network having a reference clock and carrying analog signals of data frames;

said method comprising the steps of:

extracting the reference clock from the analog signals carried by the communication network in said second network node;

comparing and detecting a phase difference between said reference clock and said second clock transmitted from said second data terminal equipment;

transmitting on a parallel data bus said phase difference digitally to a packet switching means;

converting said phase difference into a frame with an identifier header;

storing said phase difference frame and data frames sent by the second data terminal equipment before they are sent to the communication network;

switching said phase difference frame with the data frames to transmit the analog data frames to the communication network;

receiving the data frames carried by the communication network and extracting the reference clock in said first network node;

detecting and decoding in a frame decoder said phase difference among the received data frames;

transmitting said phase difference to an adjusting means which also receives said reference clock; and adjusting the reference clock phase according to the phase difference in order to transmit a corrected clock signal which stands for said first clock signal to the first data terminal equipment.

13. An apparatus to be used in a communication network including a plurality of network nodes for synchronizing a first clock signal of a first data terminal equipment DTE connected to said communication network through a first network node to second clock signal of a second data terminal equipment DTE also connected to said communication network through a second network node, said communication network having a reference clock and carrying analog signals of data frames;

said apparatus including:
means for extracting the reference clock from the analog signals carried by the communication network in said second network node;
means for comparing the phase between said reference clock and said second clock transmitted from said second data terminal equipment in order to detect a phase difference and to transmit said phase difference digitally on a parallel data bus;
a packet switching frame adapter for switching the phase difference and frames received from said second data terminal before the phase difference and frames are forwarded through a transmission channel to the communication network.

14. The apparatus of claim 13 further including means for receiving in said first network node frames carried by the communication network and extracting the reference clock in said first network node;
means for decoding said phase difference from the received frames; and
means for adjusting the reference clock phase according to the phase difference in order to transmit a corrected clock signal to the first data terminal equipment.

15. An apparatus to be used in a communication network including a plurality of networks nodes for synchronizing a first clock signal of a first data terminal equipment DTE connected to said communication network through a first network node to second clock signal of a second data terminal equipment DTE also connected to said communication network through a second network node, said communication network having a reference clock and carrying analog signals of data frames;

said apparatus including:
means for extracting the reference clock from the analog signals carried by the communication network in said second network node;
means for comparing the phase between said reference clock and said second clock transmitted from said second data terminal equipment in order to detect a phase difference and to transmit said phase difference digitally on a parallel data bus;
means for assembling the phase difference in a phase difference frame; and
a packet switching frame adapter for switching the phase difference frame and frames received from said second data terminal before the phase difference frame and the frames are forwarded through a transmission channel to the communication network.

* * * * *